(12) United States Patent
Werner

(10) Patent No.: US 9,393,681 B2
(45) Date of Patent: Jul. 19, 2016

(54) TRANSMISSION DEVICE

(71) Applicant: Robert Bosch GmbH, Stuttgart (DE)

(72) Inventor: Immanuel Werner, St. Johann (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/407,949

(22) PCT Filed: Apr. 15, 2013

(86) PCT No.: PCT/EP2013/057766
§ 371 (c)(1),
(2) Date: Dec. 13, 2014

(87) PCT Pub. No.: WO2013/185946
PCT Pub. Date: Dec. 19, 2013

(65) Prior Publication Data
US 2015/0141159 A1 May 21, 2015

(30) Foreign Application Priority Data
Jun. 13, 2012 (DE) .......................... 10 2012 209 874

(51) Int. Cl.
*B25D 16/00* (2006.01)
*B25F 5/00* (2006.01)
*F16D 7/02* (2006.01)

(52) U.S. Cl.
CPC .............. *B25D 16/003* (2013.01); *B25F 5/001* (2013.01); *F16D 7/021* (2013.01)

(58) Field of Classification Search
CPC ........... B25B 23/141; B25D 2250/165; B25D 16/003; B25F 5/001; F16D 7/02; F16D 7/021; F16D 7/048; F16D 7/10; F16D 43/2028; F16D 43/208; F16D 43/21; F16D 43/211

USPC ......................................................... 464/37
See application file for complete search history.

(56) References Cited

U.S. PATENT DOCUMENTS

| 1,443,026 A | * | 1/1923 | Leif | ................................ 464/37 |
| 3,724,815 A | * | 4/1973 | Hawkins et al. | ................. 464/37 |
| 3,770,086 A | * | 11/1973 | Jackson et al. | .................. 464/37 |
| 5,090,532 A | * | 2/1992 | Bich | ............................... 464/37 |

(Continued)

FOREIGN PATENT DOCUMENTS

| DE | 1575735 | * | 1/1970 | |
| DE | 199 03 863 A1 | | 8/2000 | |
| DE | 19929833 | * | 1/2001 | |
| DE | 101 31 220 C1 | | 3/2003 | |
| DE | 10 2008 002 593 A1 | | 12/2009 | |
| FR | 846203 A | * | 9/1939 | ............ B23B 23/141 |
| FR | 985374 | * | 7/1951 | |

(Continued)

OTHER PUBLICATIONS

International Search Report corresponding to PCT Application No. PCT/EP2013/057766, mailed Nov. 14, 2013 (German and English language document) (5 pages).

*Primary Examiner* — Josh Skroupa
(74) *Attorney, Agent, or Firm* — Maginot, Moore & Beck LLP

(57) ABSTRACT

A transmission device, in particular for a hand-held power tool, includes a sliding member coupling that has at least three sliding members disposed about an axis of rotation. The transmission device also includes at least three spring elements that are configured to exert on the sliding members at least one force component that is directed radially outwards with respect to the axis of rotation. The spring elements are supported in each case by bearing devices of sliding members disposed contiguously about the axis of rotation.

12 Claims, 4 Drawing Sheets

(56) References Cited

U.S. PATENT DOCUMENTS

| | | | |
|---|---|---|---|
| 6,012,985 A | 1/2000 | Sukup | |
| 6,666,283 B2 * | 12/2003 | Frauhammer et al. | 464/37 |
| 7,051,820 B2 | 5/2006 | Stirm | |
| 2001/0009190 A1 | 7/2001 | Frauhammer et al. | |
| 2011/0139473 A1 * | 6/2011 | Braun et al. | 173/20 |

FOREIGN PATENT DOCUMENTS

| | | | |
|---|---|---|---|
| GB | 207831 | * | 4/1925 |
| GB | 370977 | * | 4/1932 |
| WO | WO 2006004146 | * | 1/2006 |
| WO | WO 2011054807 | * | 5/2011 |

* cited by examiner

TRANSMISSION DEVICE

This application is a 35 U.S.C. §371 National Stage Application of PCT/EP2013/057766, filed on Apr. 15, 2013, which claims the benefit of priority to Serial No. DE 10 2012 209 874.7, filed on Jun. 13, 2012 in Germany, the disclosures of which are incorporated herein by reference in their entirety.

BACKGROUND

Transmission devices, in particular for hand-held power tools, comprising a sliding member clutch having at least three sliding members disposed about an axis of rotation and at least three spring elements which are provided to exert on the sliding members at least one force component directed radially outwards with respect to the axis of rotation, are known in the art.

SUMMARY

The disclosure is based on a transmission device, in particular for a hand-held power tool, comprising a sliding member clutch having at least three sliding members disposed about an axis of rotation and at least three spring elements which are provided to exert on the sliding members at least one force component directed radially outwards with respect to the axis of rotation.

It is proposed that the spring elements are each supported by bearing devices of sliding members disposed adjacently about the axis of rotation.

A "transmission device" in this context should in particular be understood to mean a device for transmitting a rotating drive movement and/or a torque. In particular, the transmission device may be provided to translate a rotational speed and/or a torque of the drive movement. The transmission device may preferably exhibit one or a plurality of gear wheels. The transmission device is preferably driven by a drive pinion. A "drive pinion" in this context should in particular be understood to mean a drive shaft of a drive unit with gearing, the radius whereof is smaller than a radius of gearing of the transmission device driven by the drive pinion. The transmission device preferably transmits the working motion and/or the torque via an output pinion, in particular to a shaft and/or a hammer tube of the hand-held power tool. The shaft and/or hammer tube are preferably connected to a tool-holding fixture for receiving a tool. A "hand-held power tool" should in particular be understood to mean a workpiece-processing machine, but advantageously a drilling machine, a hammer drill and/or percussion hammer, a saw, a plane, a screwdriver, a milling cutter, a grinder, an angle grinder, a garden utensil and/or a multi-functional tool. A "sliding member clutch" in this context should in particular be understood to mean a clutch to limit a maximum torque, wherein the torque transmission from a drive element to an output element of the sliding member clutch takes place by means of sliding members. The sliding members transmit the torque by means of frictional connection and/or preferably positive engagement. The maximum torque preferably depends on forces to which the sliding members are exposed. A "spring element" should in particular be understood to mean a macroscopic element having at least one extension which is elastically changeable by at least 10%, in particular by at least 20%, preferably by at least 30% and particularly advantageously by at least 50% and which in particular generates a counter-force dependent on a change in extension and preferably proportional to the change, which counter-force opposes the change. An "extension" of an element should in particular be understood to mean a maximum distance between two points of a perpendicular projection of the element on a plane. A "macroscopic element" should in particular be understood to mean an element with an extension of at least 1 mm, in particular of at least 5 mm and preferably of at least 10 mm. An "axis of rotation" in this context should in particular be understood to mean an axis about which the sliding member clutch is rotatably mounted and about which the drive element and output element of the sliding member clutch rotate during operation. A "bearing device" in this context should in particular be understood to mean a device that is provided to define at least one end of the spring elements in relation to the sliding member containing the bearing device in at least one, preferably at least three, degrees of freedom. The spring elements may be disposed in a particularly space-saving manner about the axis of rotation. The spring elements may in particular exhibit long spring deflections with a small clutch radius. Bearing devices of the spring elements and sliding members may be integrally formed. Components can be saved. The transmission device may be particularly simple and cost-effective.

It is further proposed that the spring elements are disposed about the axis of rotation outside a first cylinder surface, the radius of said cylinder surface being at least half the size of a radius of a further cylinder surface disposed about the axis of rotation which comes into contact with the outer contours of the sliding members in a locked state. A "locked state" in this context should in particular be understood to mean a state of the transmission device in which the transmission device is provided to transmit the rotating working motion and/or torque. An "outer contour" of a sliding member in this context should be understood to mean the contour of the sliding member on its side facing away from the axis of rotation. A periphery on which the spring elements are disposed may be particularly long. The spring elements may exhibit particularly long spring deflections.

It is further proposed that the sliding members and spring elements are disposed alternately about the axis of rotation. "Alternately about the axis of rotation" should in particular be understood to mean in this context that a spring element and a sliding member are disposed alternately about the axis of rotation. It can be advantageously achieved that each sliding member supports two spring elements and each spring element is supported by two sliding members. Further bearing devices for supporting the spring elements can be dispensed with. A space available about the periphery may be used particularly effectively to house sliding members and spring elements. The spring elements may exhibit particularly long spring deflections.

A clutch plate is further proposed which supports the sliding members in a radially outwardly movable manner. The clutch plate is preferably connected to an output shaft in a non-rotational manner by means of the output pinion. The clutch plate preferably contains sliding body holding fixtures which preferably each support a sliding member in a radially outwardly movable manner. The sliding member holding fixtures are preferably provided to support forces exerted on the clutch plate by the torque transmitted by the sliding member clutch on the clutch plate. A position of the sliding members within the sliding member clutch can be reliably guaranteed. A reliable transmission of torques and the drive motion with the help of the sliding members may be possible.

It is further proposed that the spring elements each exert spring tensions on the sliding members at least largely along the force vectors which intersect at a point on an axis of symmetry of the respective sliding member intersecting the axis of rotation. "At least largely" in this context should in particular be understood to mean an angle deviation of less than 10°, preferably less than 5°, particularly preferably less than 1°. A vector resulting from an addition of force vectors may at least largely produce a force vector directed radially outwards. Further force components of the spring elements may be at least largely removed in relation to the sliding member. A bearing of the sliding member may be subject to particularly low stress. Jamming of the sliding members can be avoided. The sliding member coupling particularly preferably comprises three sliding members and three spring elements. The force vectors of the spring tensions may form a particularly acute angle with the symmetrical axis of the sliding members intersecting the axis of rotation. The vector resulting from the addition of the force vectors may produce a particularly large force vector radially outwards. A force directed radially outwards on the sliding members caused by the spring elements may be particularly large. The spring tension of the spring elements may generate particularly efficiently a force directed radially outwards onto the sliding members.

It is proposed that in a locked state the outer contours of the sliding members form a non-positive and/or positive connection with an inner contour of a spur gear. A "spur gear" in this context should in particular be understood to mean a wheel with spur gearing surrounding the clutch plate with the sliding members about the axis of rotation. The spur gear of the drive pinion of the drive unit is preferably driven. The non-positive and/or positive connection preferably withstands up to the maximum torque. If the maximum torque is exceeded, the sliding members with their outer contour preferably begin to slide along the inner contour of the spur gear. The maximum torque that is transmitted by the sliding member clutch can be limited in this way. The maximum torque is preferably determined at least substantially by the forces caused by the spring elements and exerted radially outwards on the sliding members and also by the configuration of the outer contour of the sliding members and the inner contour of the spur gear. A person skilled in the art will configure the spring elements and also the outer contour and the inner contour in a suitable fashion, so that the maximum torque has a desired value. The maximum torque may also be adjustable, in that the spring elements are adjustably configured, for example. The spring elements may, for example, have a length-variable intermediate piece by means of which the spring tension can be altered. An effective transmission and/or limitation of the maximum torque may be possible.

The outer contours of the sliding members particularly preferably have at least one locking contour which creates a positive connection with the inner contour of the spur gear in the locked state. A "locking contour" in this context should in particular be understood to mean a region of the outer contour of the sliding members which is suitable for creating a positive connection with an inner contour, such as a projection, a depression and/or gearing, in particular. The locking contours may in particular be provided for rotary entrainment of the sliding members by the inner contour of the spur gear in the locked state. The inner contour of the spur gear preferably has a counter-contour of the locking contour. The locking contour preferably has, at least in a region transmitting a predominant part of the portion of the torque transmitted by a sliding member, a surface normal that is directed outwards at an angle in relation to a periphery about an axis of rotation and/or a convex surface on a plane lying perpendicular to the axis of rotation. It may be advantageously achieved that through transmission of the torque, a force component is generated on the sliding member that acts against force components directed radially outwards generated by the spring elements.

The person skilled in the art will configure the angle of the surface normals and also the spring tensions suitably, so that with the desired maximum torque the sliding members are forced against the spring tensions in the direction of the rotational axis and the locked state of the sliding member clutch changes into a sliding state. A torque transmission up to the maximum torque by means of a positive connection may be particularly reliable. Particularly high torques can be transmitted. Wear may be particularly low. The transmission device and/or the sliding member clutch may be particularly compact. Slippage, in other words a slow twisting of a drive side in respect of an output side of the sliding member clutch below the maximum torque can be avoided.

It is further proposed that the transmission device for transmitting a rotating working motion is provided with a torque limited by the sliding member clutch. An overload of the drive unit can be prevented when a tool suddenly locks. Injuries to the user caused by a locking tool can be avoided. The safety and/or service life of a hand-held power tool can be improved.

A hand-held power tool with a transmission device according to the disclosure is further proposed. The hand-held power tool may exhibit the aforementioned advantages of the transmission device. In particular, the hand-held power tool may be particularly compact.

BRIEF DESCRIPTION OF THE DRAWINGS

Further advantages emerge from the following drawing description. An exemplary embodiment of the disclosure is depicted in the drawings. The drawings, description and claims contain a combination of numerous features. The person skilled in the art will also advantageously observe the features individually and bring them together into further meaningful combinations.

In the figures.

DETAILED DESCRIPTION

Figure 1:
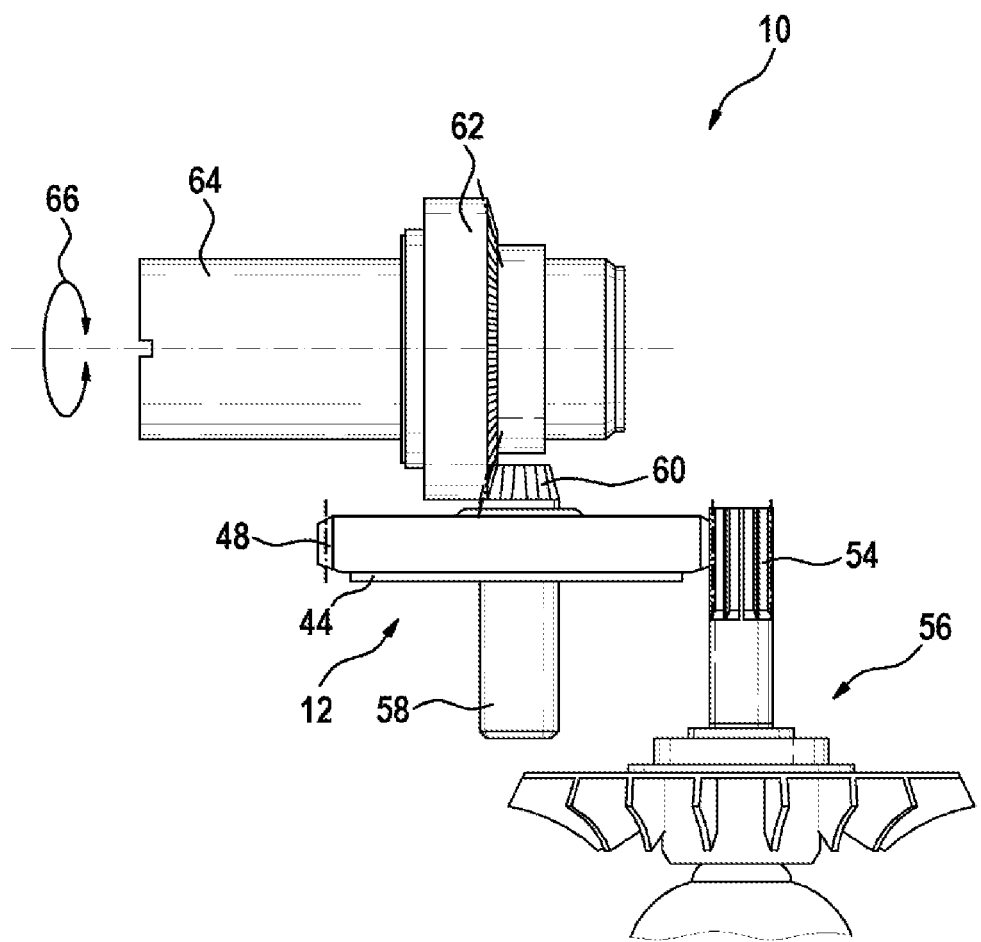
FIG. 1 shows a schematic representation of a transmission device with a sliding member clutch.
Figure 5:
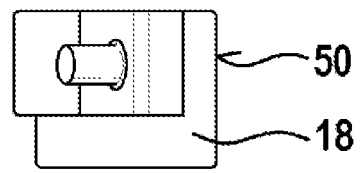
FIG. 5 shows a sliding member as a second view.
Figure 6:
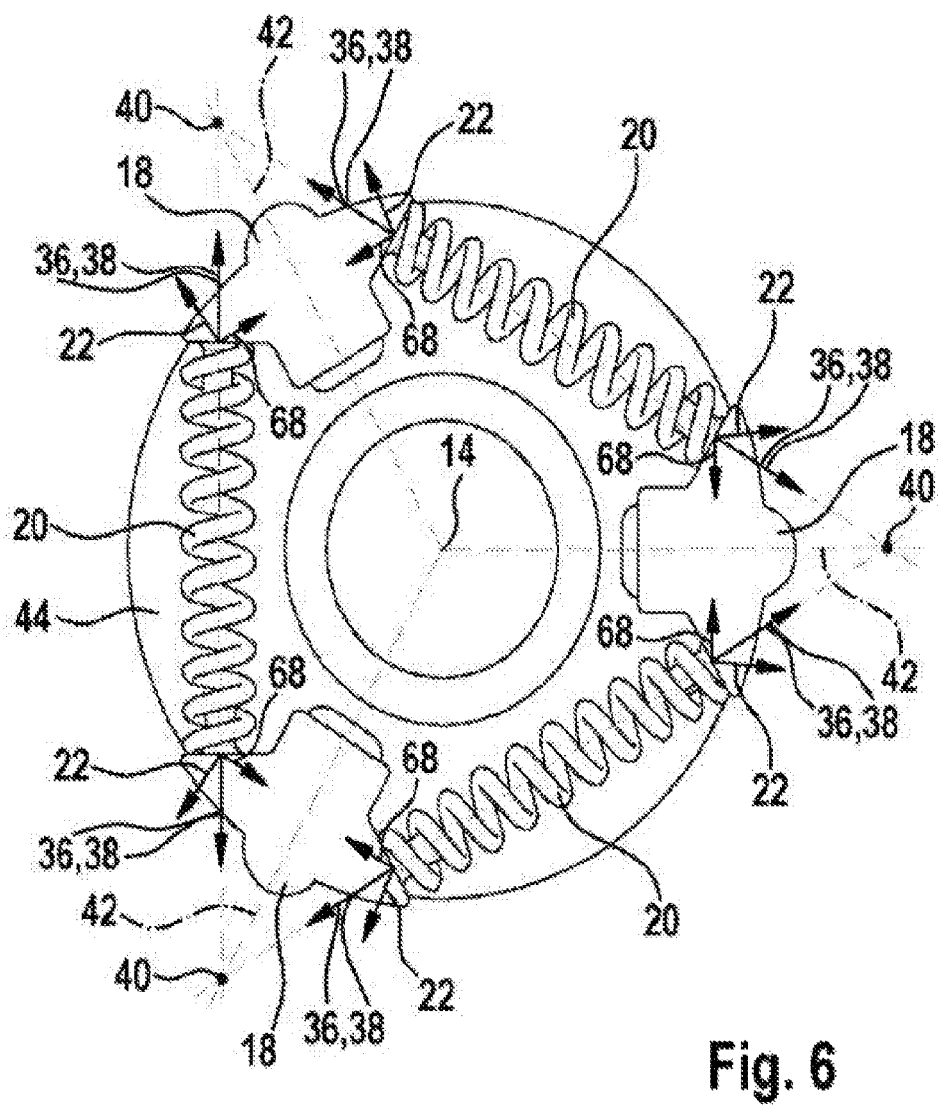
FIG. 6 shows a clutch plate of the sliding member clutch with three sliding members and three spring elements in plan view.

FIG. 1 shows a transmission device 10 for a hand-held power tool not shown here, comprising a sliding member clutch 12 having three sliding members 18 (FIG. 6) disposed about an axis of rotation 14 and three spring elements 20 configured as helical springs which are provided to exert on the sliding member 18 at least one force component 22 directed radially outwards with respect to the axis of rotation 14, characterized in that the spring elements 20 are each supported by bearing devices 24 (FIG. 4 and FIG. 5) configured as journals of sliding members 18 disposed adjacently about the axis of rotation 14. The transmission device 10 has a spur gear 48 which can be driven by a drive pinion 54 of a drive unit 56 of the hand-held machine tool. The spur gear 48 surrounds a transmission shaft 58 with an output pinion 60 about the common axis of rotation 14. During drilling with the drive unit 56 activated, the output pinion 60 drives a hammer tube 64 of the hand-held power tool surrounded by a gear wheel 62 with a rotating working motion 66. A tool holder not shown here is connected in a non-rotational manner to the hammer tube 64. The hand-held power tool is configured as a hammer drill and percussion hammer. For drilling in drilling mode a user can lock a drill bit into the tool holder which can drive via the hammer tube 64 with the rotating working motion 66. In addition, in percussion drilling mode a hammer arranged in the hammer tube 64 can transmit striking impulses to the drill bit. The sliding member clutch 12 is provided to limit a maximum torque of the rotating working motion 66. If the maximum torque is exceeded, the sliding member clutch slips, so that the maximum torque that can be transmitted by the drive unit 56 is not, or only partially, transmitted at the output pinion 60 of the transmission device 10 to the gear wheel 62 on the hammer tube 64.

Figure 2:
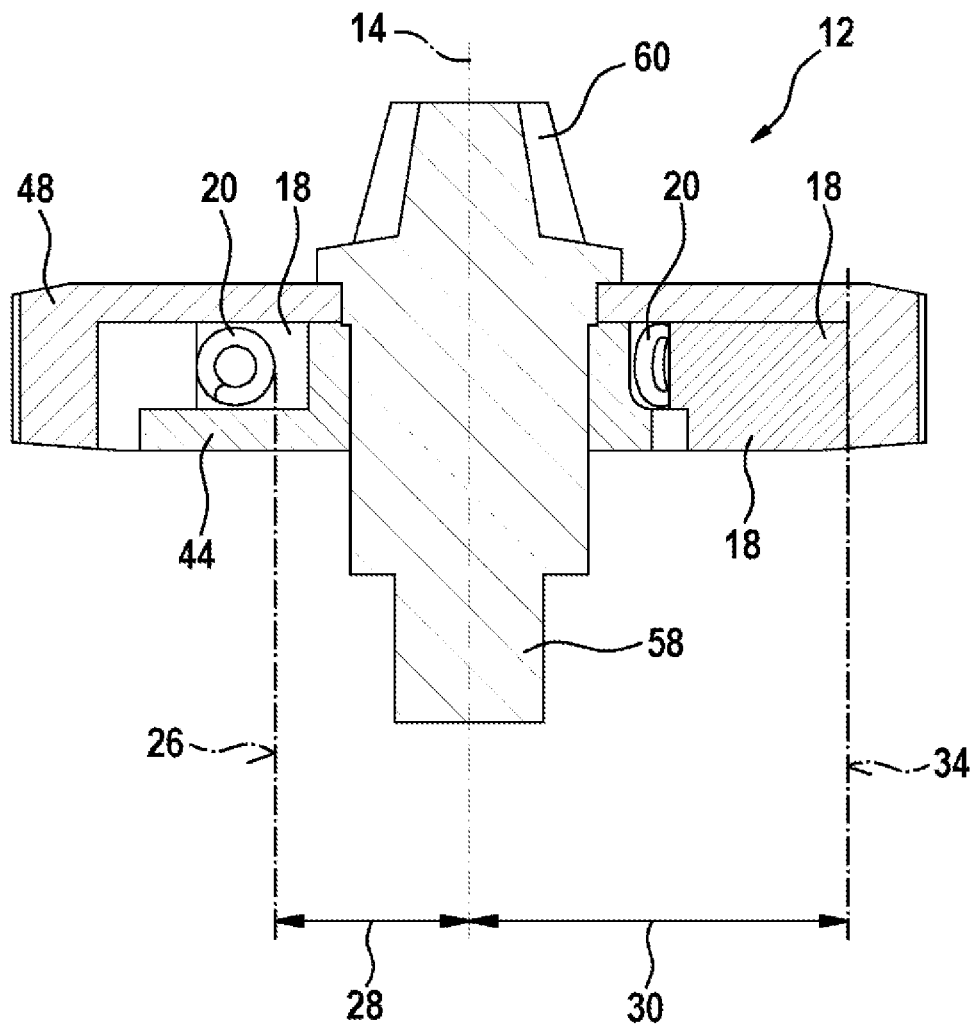
FIG. 2 shows a schematic representation of a section through the sliding member clutch in side view.
Figure 3:
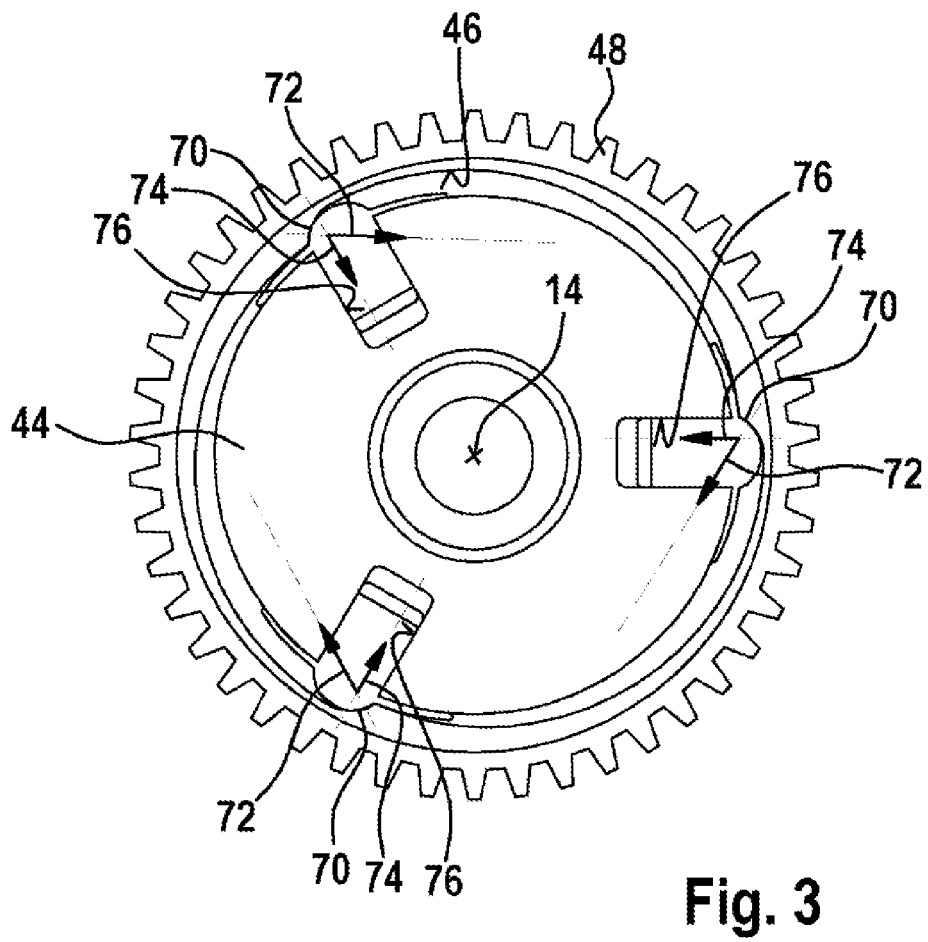
FIG. 3 shows a schematic representation of the sliding member clutch with three sliding members in plan view.

The spring elements 20 are disposed outside a first cylinder surface 26 about the axis of rotation 14, the radius 28 whereof is more than half the size of a radius 30 of a further cylinder surface 34 (FIG. 2) disposed about the axis of rotation 14 in contact with outer contours 32 of the sliding members 18 in a locked state. The sliding members 18 and the spring elements 20 are disposed alternately about the axis of rotation 14. A clutch plate 44 disposed within the spur gear 48 connected to the transmission shaft 58 in a non-rotational manner supports the sliding members 18 on the sliding member holding fixtures 76 in a radially outward movable manner. The transmission shaft 58 with the clutch plate 44 forms the sliding member clutch 12 along with the sliding members 18, the spring elements 20 and the spur gear 48.

Figure 4:
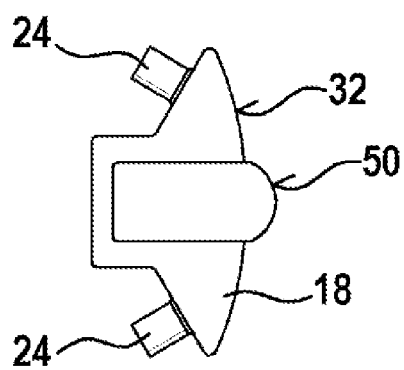
FIG. 4 shows a sliding member as a first view.

The spring elements 20 each exert spring tensions 36 on the sliding members 18 along force vectors 38 which intersect at a point 40 on an axis of symmetry 42 intersecting the axis of rotation 14 of the sliding member 18 (FIG. 4). The force vectors 38 each contain force components 22 directed radially outwards and force components 68 opposing one another. The force components 68 cancel one another out, while the force components 22 accumulate, so that the sliding members 18 are forced radially outwards by the force components 22. In the locked state, the outer contours 32 of the sliding members 18 lie on an inner contour 46 of the spur gear 48 and form a positive connection with the inner contour 46. The outer contours 32 of the sliding members 18 each contain a locking contour 50 which is configured as a locking lug and which comes to lie in one of the entrainment contours 70 of the inner contour 46 in the locked state. The locking contours 50 exhibit convex surfaces on a plane lying perpendicular to the axis of rotation 14. With a rotary entrainment of the sliding members 18 by the inner contour 46 of the spur gear 48, forces 72 are exerted on the sliding members 18 by the torque transmitted through the drive pinion 54, which forces comprise force components 74 directed against the axis of rotation 14, which force components are directed against the force components 22 and force the sliding members 18 radially inwards. If a torque bearing against the sliding member clutch 12 exceeds the maximum torque, the force components 74 are greater than the force components 22 acting on a sliding member 18, so that the locking contours 50 are forced out of the entrainment contours 70 and the sliding member clutch moves into a sliding state. The transmission device 10 is provided to transmit the working motion 66 with a torque limited by the sliding member clutch 12.

The invention claimed is:

1. A transmission device, comprising:
    a sliding member clutch having at least three sliding members about an axis of rotation and at least three spring elements configured to exert on the sliding members at least one force component directed radially outwards with respect to the axis of rotation,
    wherein each of the sliding members of the at least three sliding members is located at a different angular position relative to the axis of rotation,
    wherein each of the sliding members of the at least three sliding members includes a first bearing device and a second bearing device,
    wherein each of the spring elements of the at least three spring elements has a first end and a second end,
    wherein each of the spring elements of the at least three spring elements extends between a different pair of adjacent sliding members from the at least three sliding members,
    wherein the first end of each of the spring elements is supported by the first bearing device of a first sliding member from the pair of adjacent sliding members associated with the spring element, and
    wherein the second end of each of the spring elements being supported by the second bearing device of a second sliding member of the pair of adjacent sliding members associated with the spring element.

2. The transmission device as claimed in claim 1, wherein the spring elements are disposed about the axis of rotation outside a first cylinder surface, wherein a radius of the cylinder surface is at least half the size of a radius of a further cylinder surface disposed about the axis of rotation which comes into contact with outer contours of the sliding members in a locked state.

3. The transmission device as claimed in claim 1, wherein the sliding members and the spring elements are disposed alternately about the axis of rotation.

4. The transmission device as claimed in claim 1, further comprising a clutch plate that supports the sliding members in a radially outwardly movable manner.

5. The transmission device as claimed in claim 1, wherein the spring elements each exert spring tensions on the sliding members at least largely along force vectors that intersect at a point on an axis of symmetry of the respective sliding member intersecting the axis of rotation.

6. The transmission device as claimed in claim 1, wherein in the locked state at least one outer contour of the sliding members forms one or more of a non-positive connection and a positive connection with an inner contour of a spur gear.

7. The transmission device as claimed in claim 6, wherein the outer contours of the sliding members have locking contours that create a positive connection with the inner contour of the spur gear in the locked state.

8. The transmission device as claimed in claim 1, wherein the transmission device, for transmitting a rotating working motion, is provided with a torque limited by the sliding member clutch.

9. The transmission device as claimed in claim 1, wherein the transmission device is configured for a hand-held power tool.

10. A hand-held power tool, comprising:
    a transmission device including:
        a sliding member clutch having at least three sliding members disposed about an axis of rotation and at least three spring elements configured to exert on the sliding members at least one force component directed radially outwards with respect to the axis of rotation,
        wherein each of the sliding members of the at least three sliding members is located at a different angular position relative to the axis of rotation,
        wherein each of the sliding members of the at least three sliding members includes a first bearing device and a second bearing device, wherein each of the spring elements of the at least three spring elements has a first end and a second end, wherein each of the spring elements of the at least three spring elements extends between a different pair of adjacent sliding members from the at least three sliding members, wherein the first end of each of the spring elements is supported by the first bearing device of a first sliding member from the pair of adjacent sliding members associated with the spring element, and wherein the second end of each of the spring elements being supported by the second bearing device of a second sliding member of the pair of adjacent sliding members associated with the spring element.

11. The hand-held power tool as claimed in claim 10, wherein the hand-held power tool is configured as one or more of a hammer drill and a percussion hammer.

12. A transmission device, comprising:

a sliding member clutch having at least three sliding members disposed about an axis of rotation and at least three spring elements configured to exert on the sliding members at least one force component directed radially outwards with respect to the axis of rotation, wherein the spring elements are each supported by bearing devices of the sliding members disposed adjacently about the axis of rotation, wherein each respective spring element of the at least three spring elements extends between a respective first sliding member and a respective second sliding member of the at least three sliding members disposed about the axis of rotation, and wherein each respective spring element has a first end supported by a bearing device of the respective first sliding member associated with the respective spring element and a second end supported by a bearing device of the respective second sliding member associated with the respective spring element, and wherein the sliding members and the spring elements are disposed alternately about the axis of rotation.

\* \* \* \* \*